(12) United States Patent
Algüera

(10) Patent No.: US 7,789,412 B2
(45) Date of Patent: Sep. 7, 2010

(54) ADJUSTING DEVICE, AIR DEFLECTING SYSTEM, CONTROL MEMBER AND DEVICE ENABLING AERODYNAMIC RESISTANCE OF A SEMI-TRAILER TO BE REDUCED

(75) Inventor: José Algüera, Aschaffenburg (DE)

(73) Assignee: Jost-Werke GmbH, Neu-Isenburg (DE)

( * ) Notice: Subject to any disclaimer, the term of this patent is extended or adjusted under 35 U.S.C. 154(b) by 190 days.

(21) Appl. No.: 11/662,008

(22) PCT Filed: Sep. 3, 2005

(86) PCT No.: PCT/EP2005/009483

§ 371 (c)(1), (2), (4) Date: Mar. 6, 2007

(87) PCT Pub. No.: WO2006/029732

PCT Pub. Date: Mar. 23, 2006

(65) Prior Publication Data
US 2008/0036173 A1   Feb. 14, 2008

(30) Foreign Application Priority Data
Sep. 18, 2004 (DE) .................. 10 2004 045 662

(51) Int. Cl.
B62D 53/06 (2006.01)
(52) U.S. Cl. .................. 280/438.1; 280/407; 280/407.1
(58) Field of Classification Search .............. 280/438.1, 280/407, 407.1
See application file for complete search history.

(56) References Cited

U.S. PATENT DOCUMENTS

| 4,429,892 A | 2/1984 | Frampton et al. |
| 4,649,369 A | 3/1987 | Walker et al. |
| 4,904,015 A | 2/1990 | Haines |
| 5,861,802 A | 1/1999 | Hungerink et al. |
| 5,863,057 A * | 1/1999 | Wessels ................... 280/149.2 |
| 5,915,713 A | 6/1999 | Kniep |
| 6,203,045 B1 | 3/2001 | Kyrtsos et al. |
| 6,247,720 B1 * | 6/2001 | Linger et al. ................. 280/441 |
| 6,357,777 B1 * | 3/2002 | Linger et al. ................. 280/441 |
| 6,578,648 B2 | 6/2003 | Bell |

(Continued)

FOREIGN PATENT DOCUMENTS

DE   198 929   10/1906

(Continued)

Primary Examiner—Lesley Morris
Assistant Examiner—Marlon A Arce
(74) Attorney, Agent, or Firm—Hudak, Shunk & Farine, Co., L.P.A.

(57) ABSTRACT

The invention concerns a device for adjusting a fifth wheel, comprising a displacement device provided with two guide rails placed on the vehicle, in particular on a tractor semi-trailer combination in the longitudinal direction thereof, said guide rails whereon a slide may be installed capable of being moved by means of an actuating device, said actuating device being designed such that, upon a displacement, the positive connection between the guide rails and the slide is maintained. The invention is characterized in that said actuating device which is designed to move the slide, comprises a first powered device. Additionally, at least one first position sensor is arranged to detect the position of the slide, at least said first position sensor being connected to a control device.

20 Claims, 9 Drawing Sheets

U.S. PATENT DOCUMENTS 6,592,230 B2    7/2003    Dupay

FOREIGN PATENT DOCUMENTS

| DE | 1 780 488    | 1/1972  |
|----|--------------|---------|
| DE | 198 39 357   | 3/2000  |
| DE | 199 44 684   | 11/2000 |
| EP | 0 503 954    | 9/1992  |
| EP | 1 031 497    | 8/2000  |
| EP | 1 561 676    | 8/2005  |
| FR | 2 625 472    | 7/1989  |
| GB | 2 128 950    | 5/1984  |
| JP | 2002-302073  | 10/2001 |
| JP | 2003-089365  | 3/2003  |
| WO | 02/070328    | 9/2002  |

* cited by examiner

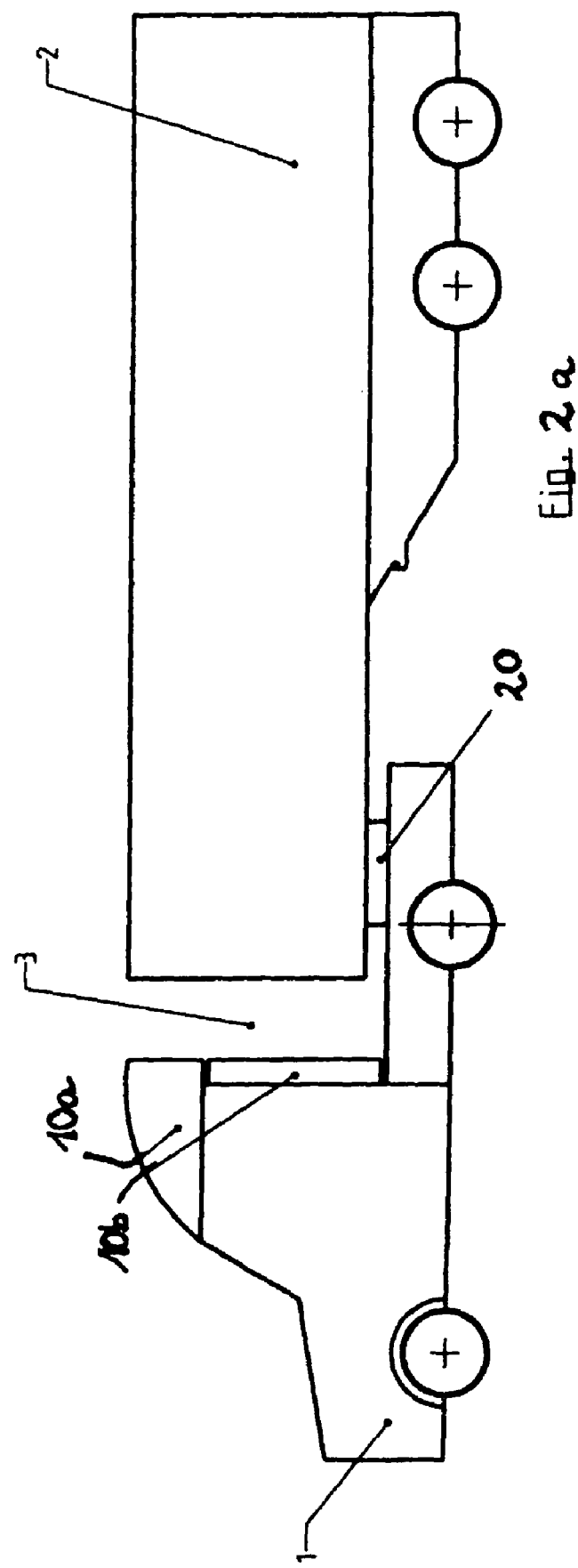

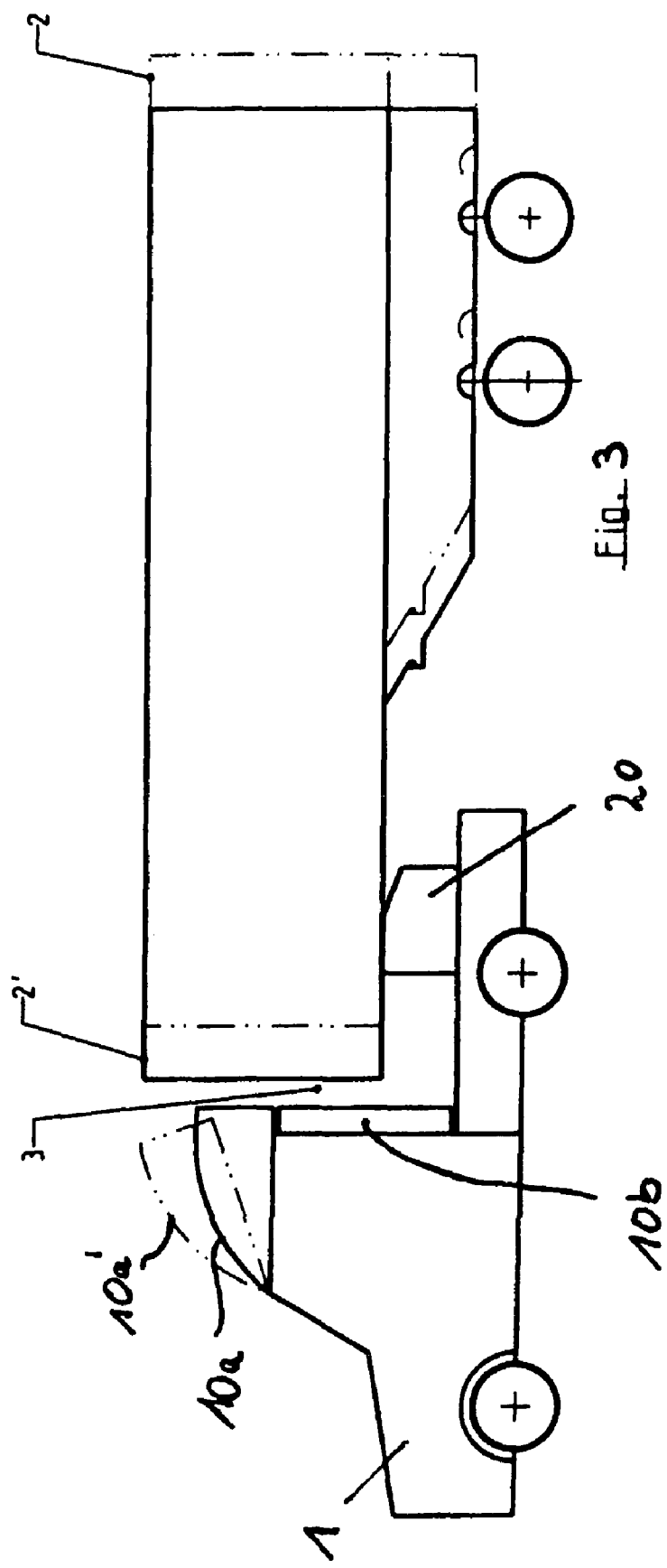

ADJUSTING DEVICE, AIR DEFLECTING SYSTEM, CONTROL MEMBER AND DEVICE ENABLING AERODYNAMIC RESISTANCE OF A SEMI-TRAILER TO BE REDUCED

FIELD OF THE INVENTION

The invention relates to an adjusting device for a "fifth wheel" coupling for a semi-trailer, according to the preamble of claim 1. The invention further relates to a wind deflecting system disposed on the cab of the tractor of a tractor and semi-trailer combination, and to a control system for a tractor vehicle having a fifth wheel coupling. The invention further concerns a device for reducing the air resistance of a tractor and semi-trailer combination.

BACKGROUND OF THE INVENTION

Displacement devices are known, e.g. from DE AS 1780488, EP 0503954 A1, and DE 19944684 C1.

Further, WO 02/070328 A1 discloses a displacement device having two guide rails with toothed beams, wherewith a slide or carriage is slidably disposed on said rails, which slide bears a fifth wheel coupling. The displacement device is disposed on the slide, and has locking pieces which engage the toothed beams.

In addition to horizontal displacement of the fifth wheel coupling, it is also possible to raise and lower the fifth wheel coupling, wherewith the semi-trailer will have different heights or altitudes, for desired adjustment purposes. Lifting devices are known which can accomplish such raising and lowering, e.g. as disclosed in DE 198929 A1 or DE 19839357 A1.

The fifth wheel coupling must bear appreciable forces not only in the vertical direction but also in the direction of travel and in the lateral direction; accordingly, the fifth wheel coupling must be robust and stable with respect to the vehicle frame(s) in all directions, whether in a raised or in a lowered position. In this connection, the lifting device according to DE 19828357 A1 has a base plate to which lever arms are swingably mounted so as to be swingable around a horizontal axis. The fifth wheel coupling and adjusting arms are disposed at the other end of the lever arms. Pressure cylinders are disposed between the adjusting arms and the lever arms, which cylinders serve to raise and lower the lifting device. This lifting device can be remotely operated, but the driver must locally check or observe and verify the particular lifting altitude.

The heretofore known displacement and lifting devices are designed to adjust to the given configuration of the tractor and semi-trailer prior to the driving of the vehicle. However, it has been found that the intermediate space or gap between the front of the semi-trailer and the cab of the tractor experiences or causes aerodynamic turbulence while the vehicle is being driven, which turbulence influences the air resistance and thereby the fuel consumption of the tractor and semi-trailer combination.

In order to counteract this turbulence effect, wind deflectors are often employed to cause the air to stream over the gap in a controlled manner. Such deflectors are heavy and costly, and are installed in a fixed position. Any change in the deflector configuration must be performed manually, which generally requires intervention by the adjusting individual in the gap itself.

In principle, it is desirable to arrange for the described intermediate space or gap to be as small as possible. However, if the gap is too small, the corners of the semi-trailer will strike the rear wall of the cab of the tractor when the vehicle is negotiating a curved path.

Situations may also arise when it is desirable to have a large gap, e.g. in order to provide space for special equipment, or while parked to increase the accessibility to the supply lines running to the semi-trailer.

Known displacement devices allow the semi-trailer to be displaced, but they require the driver to unlock the displacement device mechanism and then change the gap by moving the tractor, then to re-engage the mechanism and judge whether the mechanism is now properly re-engaged and locked. This process involves appreciable physical stress and exertion by the driver, which may indeed injure the driver. Further, the adjustment requires the vehicle to be stationary; it cannot be performed while the vehicle is underway.

SUMMARY OF THE INVENTION

Accordingly, an underlying problem of the invention is to devise a device and control system whereby the position of the semi-trailer relative to the tractor can be changed, even while the vehicle is underway; and in particular to provide means of reducing the air resistance of the tractor and semi-trailer combination which is experienced at high speeds.

This problem is solved, according to a first alternative, by means of an adjusting device wherein the actuating device for accomplishing the displacement of the slide is comprised of a first motor drive, wherewith at least one "first position sensor" is provided, for determining the position of the slide, wherewith at least the said "first position sensor" is connected to a control device.

Because the form-interlocking engagement is maintained, the displacement mechanism does not become disengaged or "unlocked", wherewith in particular during the displacement process the slide is at all times held securely. This prevents the semi-trailer from moving in an uncontrolled fashion with respect to the tractor and causing damage.

The motorized drive provides a novel means of changing the position of the fifth wheel coupling during travel. The "gap", the size of the intermediate space between the tractor cab and the semi-trailer, can be adjusted on an ad hoc basis in response to the driving situation; e.g., when traveling slowly, such as while maneuvering, or when stationary, the gap may be large, and when traveling at high speed on a highway the gap may be made small. During high speed travel, the turbulence in the intermediate space between the cab of the tractor and the front of the semi-trailer will thus be reduced, reducing the overall air resistance of the tractor and semi-trailer combination.

The position sensors provide the driver with information about the location of the fifth wheel coupling, particularly during travel, and information concerning available adjusting excursions of the displacement device and thus of the fifth wheel coupling; as a result it will be possible to displace the fifth wheel coupling by means of control signals sent by the driver or by automatic control means. In the case of automatic control, predetermined values to be used for the given driving situation may be entered into the control device.

Accordingly, advantageously the control device is electrically connected to the first drive device.

Preferably, the control device comprises a display device which may be in the form of an optical and or acoustic device, and which preferably is disposed in the cab. The display device may be permanently active, whereby the position of the fifth wheel coupling is indicated continuously. The display may be coupled to the vehicle ignition, so that when the ignition is turned on the current position of the fifth wheel coupling and/or of the slide is/are indicated.

Drive means which might be used which provide the necessary form-interlocking feature preferably have at least one drive spindle with spindle nut(s), or have at least one rack and pinion or rack and spur gear. Drive means which employ pressure cylinders with cylinder and plunger also satisfy the requirements for continuous engagement, and may be employed as the specified motor drives.

When the drive means comprises a drive spindle and spindle nut, preferably the spindle nut is disposed on the slide.

The locations and types of position sensors depend on the particular configuration of the displacement device.

The "first position sensor" may comprise, e.g., a distance sensor. The "first position sensor" may also comprise a rotational angle sensor, e.g. if a drive motor with a drive spindle is employed.

It is also possible to dispose at least two "first position sensors" on a guide rail, wherewith in this instance preferably the position sensors are inductive sensors.

If the tractor cab and semi-trailer have different heights, this tends to adversely affect the air resistance of the tractor and semi-trailer combination. It is therefore advantageous if the fifth wheel coupling is not only horizontally adjustable but also can be raised and lowered. Depending on the structural features, e.g., it may be possible to lower the semi-trailer so far that it "disappears" behind the tractor cab, such that the air resistance is now determined essentially by the tractor alone.

For this purpose, the adjusting device is comprised of a displacement device and also a lifting device.

Preferably the lifting device is disposed on the slide of the displacement device. In this case, the fifth wheel coupling is connected to the lifting device.

It is also possible to position the lifting device on the tractor, and moreover to associate the lifting device with the displacement device. In this case, the guide rails of the displacement device are disposed on the lifting device, and the fifth wheel coupling is attached to the displacement device.

Preferably, the lifting device has its own second motor drive, which is of a type which also preserves form-interlocking conditions during raising and lowering.

The second motor drive is also connected to the control device, to allow the lifting device to be actuated by the driver or automatically.

The lifting device has at least one "second position sensor", which determines the lifting altitude and which is connected to the control device.

Preferably, the control device comprises a monitoring device which preferably monitors the functionality of the position sensor(s) and which may also monitor additional electronic components.

In some cases, the height of the semi-trailer behind the tractor cab may not be susceptible of being reduced, wherewith it may be advantageous to employ at least one wind deflector on the roof of the cab. Such wind deflectors are per se known; typically such a deflector comprises a curved deflector baffle plate.

The inventive wind deflector system, comprised of at least one wind deflector for the roof of the tractor cab of the tractor of a tractor and semi-trailer combination, is characterized in that the wind deflector is swingably mounted on the roof and is associated with a third motor drive; and in that at least one "third position sensor" is provided which determines the adjustment angle of the wind deflector and which is connected to a control device.

It is advantageous if the third drive means is also connected to the control device, so that the wind deflector is also remotely adjustable, being swingable either by the driver via control commands or automatically, taking into account the position signals of the position sensor(s).

The wind deflector on the roof of the cab is swingable around a horizontal axis. The wind deflector system may also comprise wind deflectors disposed laterally on the cab which are swingable around a vertical axis. These lateral wind deflectors may have a fourth drive device and at least one position sensor, which are connected to the control device.

The control device for the wind deflector system may be a separate control device. It is also possible for the "third position sensor(s)" and/or the "fourth position sensor(s)", and/or the third drive device(s) and/or the fourth drive device(s), to be connected to the control device.

The inventive control system for a tractor and semi-trailer combination with a fifth wheel coupling proposes a control device and at least one position sensor, which sensor is disposed on a displacement device, and/or on a lifting device of the fifth wheel coupling, and/or on a swingable wind deflector on the cab of the tractor; wherewith the control device is electrically connected to at least one position sensor, and is also connected to: a drive means of the displacement device; and/or the lifting device of the fifth wheel coupling; and/or the actuator of the wind deflector system.

The control system also preferably comprises a monitoring device which preferably monitors the functionality of the sensor(s), and possibly also the functionality of other electronic components. This enhances the safety and certainty of the adjustment of the wind deflector(s) and/or fifth wheel coupling. The monitoring device may be designed such that, e.g., one cannot adjust the wind deflector(s), displacement device, and/or lifting device unless the functionality of at least all of the position sensors is verified.

The control system is also characterized in that it comprises a display device which displays the horizontal and/or vertical position of the fifth wheel coupling, and/or the angle of inclination of the wind deflector(s). This display device is preferably disposed in the tractor cab, in order to inform the driver about the current positions of the respective components.

The control device may also be connected to the adjustable shock-absorbing system of the semi-trailer, so that when a height adjustment is applied to the fifth wheel coupling a height adjustment can also be performed in the region of the chassis.

Preferably, the control device is configured so as to evaluate the position signals from the position sensors, and to compare said signals with set-point values, and then to send control signals to the drive means. This enables automatic operation, in which the intervention of the human driver is not required. The set-point values may depend on, e.g., the vehicle speed, wherewith when traveling at high speed on a highway the set-point value for the gap between the tractor cab and the front of the semi-trailer may result in forward displacement of the fifth wheel coupling by means of the displacement device so as to minimize said gap. The control device may also be arranged to automatically optimize the inclination of the wind deflector(s), and, in coordination therewith, to lower the semi-trailer by means of the lifting device if the configuration allows such lowering.

According to another embodiment, the control device may have feedback control means. With the use of calibrated characteristic curves, the control of the adjusting device may be adjusted to, e.g., the driving conditions.

According to a second alternative, the inventive device is a device for reducing the air resistance of a tractor and semi-trailer combination, said device comprised of a displacement device for displacing the fifth wheel coupling in the longitudinal direction of the tractor, and/or a lifting device for raising or lowering the fifth wheel coupling, and/or a wind deflector which is swingably mounted on the cab of the tractor, wherewith the displacement device and/or the lifting device and/or the wind deflector(s) have motor drives and position detectors, with the drives and position detectors being connected to a common control device.

BRIEF DESCRIPTION OF THE DRAWINGS

Exemplary embodiments of the invention will be described in more detail hereinbelow, with reference to the accompanying drawings.

FIGS. 1, 2a, 2b, and 3 are lateral views of a tractor and semi-trailer combination, wherein the semi-trailer is in different positions;

DETAILED DESCRIPTION OF THE INVENTION

Figure 1:
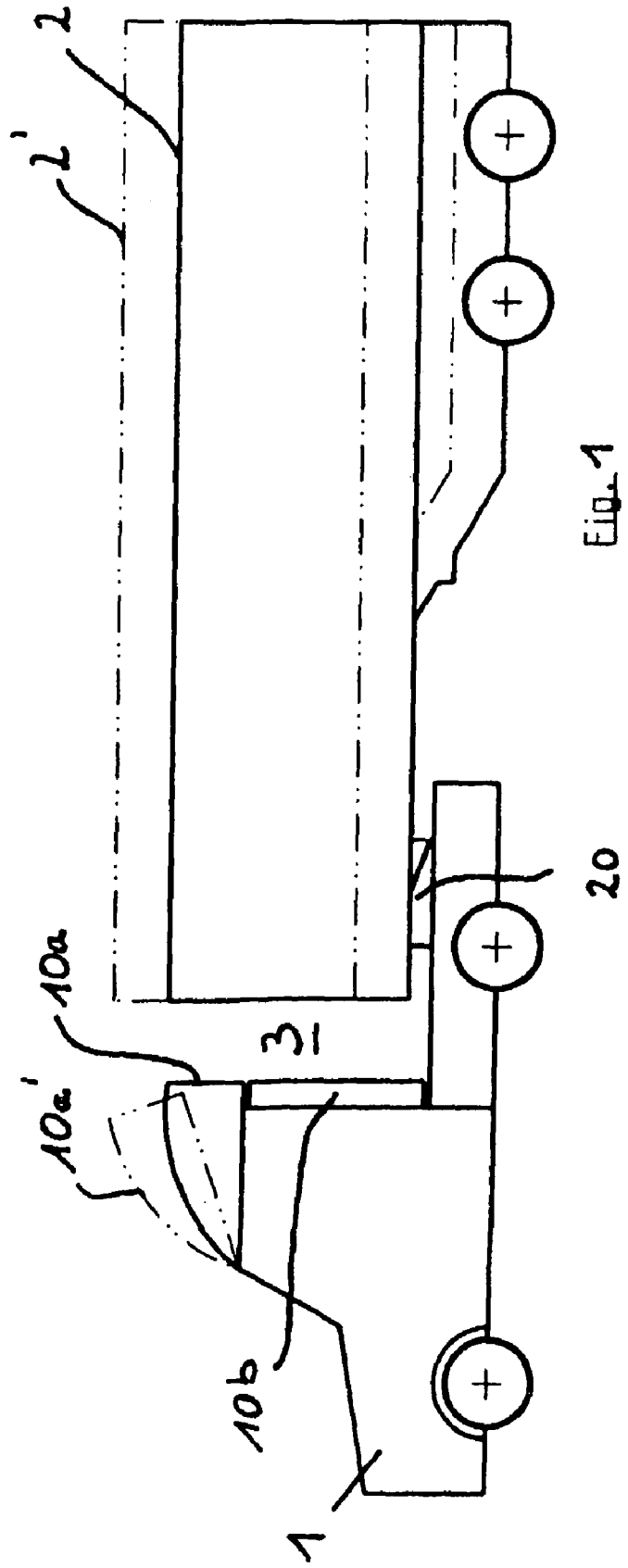

In FIGS. 1 to 3, a tractor and semi-trailer combination is illustrated which is comprised of a tractor vehicle 1 and a semi-trailer 2, in different positions. The Tractor 1 has an adjusting device 20 with a "fifth wheel" coupling disposed on it, which fifth wheel coupling engages the semi-trailer 2 via the main pivot of said semi-trailer. The adjusting device is shown only schematically in FIGS. 1 to 3. The tractor 1 bears a swingably adjustable wind deflector 10a on its roof 4, and lateral wind deflectors (10b) mounted on the cab of the tractor.

The semi-trailer 2 is shown in a raised position 2' in dashed lines in FIG. 1, in connection with which situation the wind deflector 10a' is in its upwardly swung position. To reduce wind resistance, the semi-trailer may be lowered to the position 2, in connection with which situation the adjusting device 20 and the frame of the semi-trailer are lowered. The said frame is lowered in particular via spring-loaded adjusting means, namely pneumatic cushioning or the shock absorber system of the semi-trailer; for this purpose, the said spring-loaded cushioning and adjusting means of the semi-trailer is connected to the control device for the adjusting device 20.

Figure 2B:
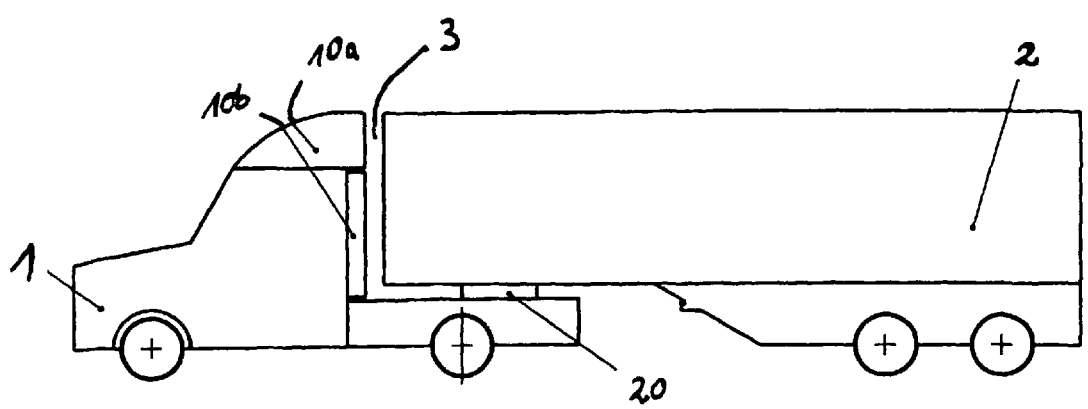

The semi-trailer 2 is shown in a lowered position in FIG. 2a, wherewith the upper edge of the semi-trailer is at the same altitude as the topmost locus of the wind deflector 10a, which wind deflector 10a is also in a lowered position. In this configuration, the intermediate space 3 between the cab 1 and the front of the semi-trailer 2 is relatively large, wherewith at high highway speeds turbulence develops in this space which tends to pose resistance to the vehicle. In order to remedy this extra resistance, it is possible to shift the fifth wheel coupling forward, leftward, in the figure, reducing the size of the intermediate space 3 (FIG. 2b).

FIG. 3 shows the semi-trailer (2', 2) in a raised position, with a small or large intermediate space 3. Such a raised position is advantageous when moving over uneven terrain or for extreme maneuvering.

All of the position changes illustrated can be carried out during travel.

Figure 4:
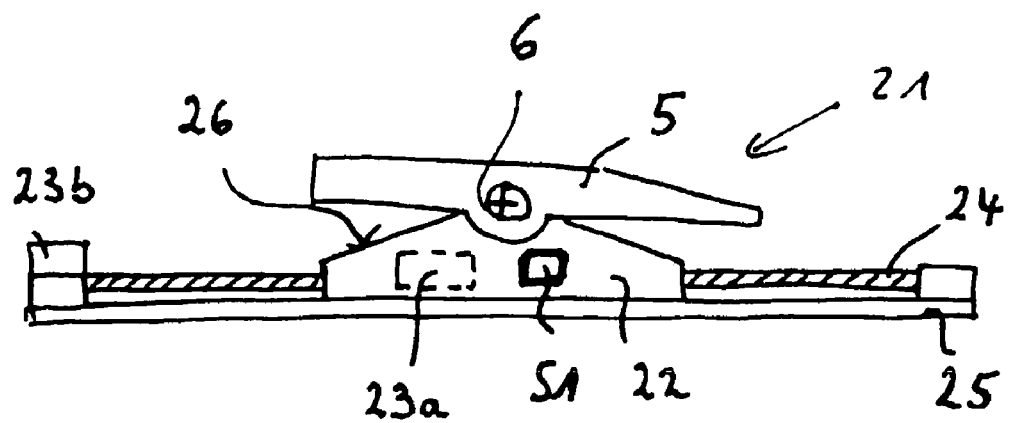
FIG. 4 is a lateral view of a displacement device.

FIG. 4 shows schematically a lateral view of a displacement device 21. A slide 26 is displaceably mounted on a frame 25. Guide rails 27 are provided on the frame 25 for guiding the slide (see FIG. 5). Bearing pedestals 6 are fixed to the slide 26, for supporting the fifth wheel coupling 5.

Figure 5:
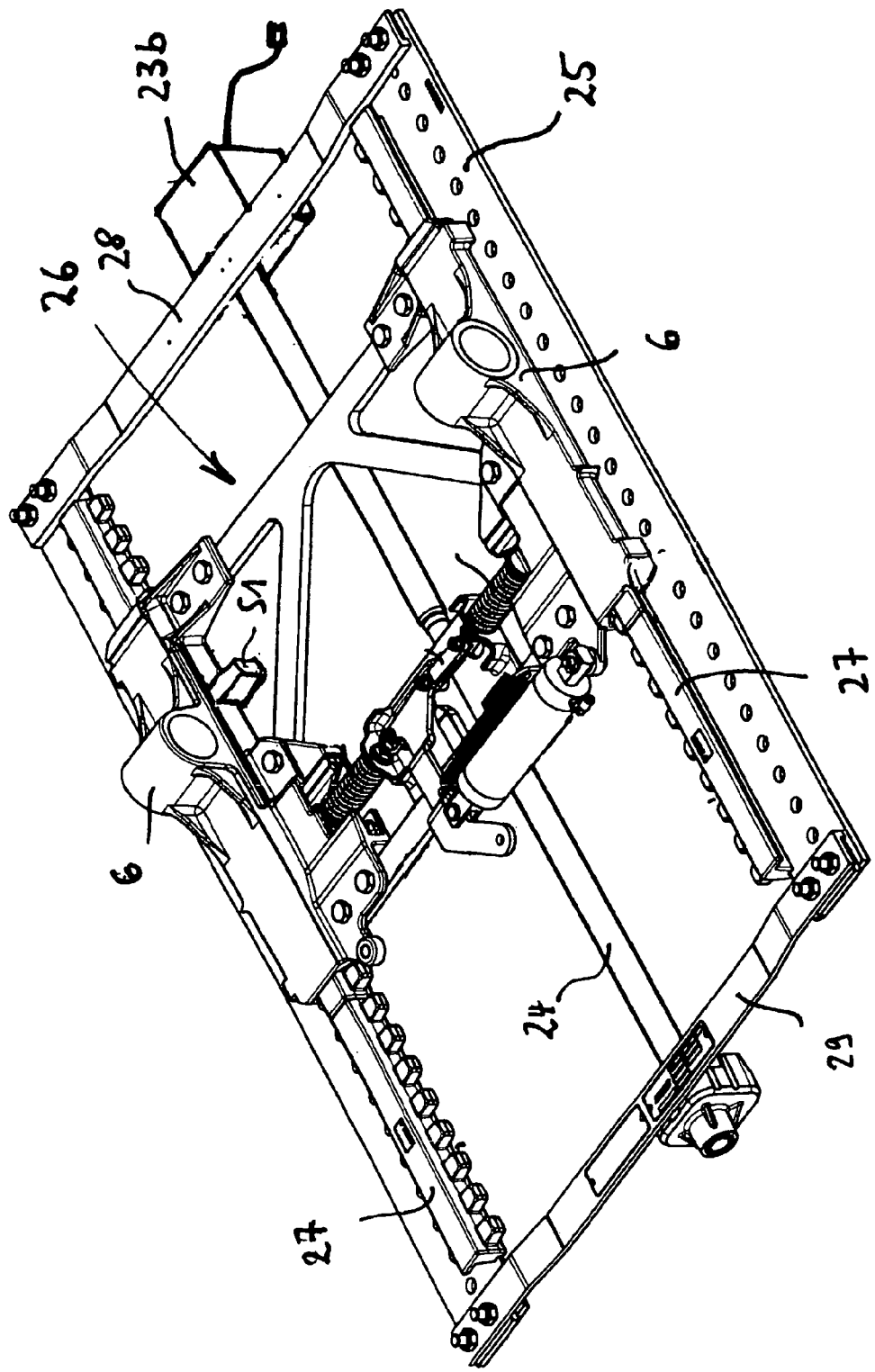
FIG. 5 is a perspective plan view of a displacement device.

The slide 26 is driven by a drive spindle 24 and a motor drive (23a or 23b), wherewith the drive spindle 24 engages a spindle nut 22 on the slide 26 (nut not visible in FIG. 5). The motor drive 23a may be mounted on the slide 26; or alternatively the motor drive 23b may be mounted on a traverse 28 of the frame 25 (as shown in FIG. 5). The drive spindle 24 is rotatably mounted on a traverse 29 of the frame 25. The form-interlocking engagement of the spindle nut 22 and the drive spindle 24 remains in effect during the displacement of the slide 26; thus the controlled displacement is possible even while the vehicle is traveling.

A "first position sensor" S1 is attached to the slide 26; sensor S1 may comprise an inductive sensor which interacts with corresponding counterpart elements which may be disposed, e.g., on the guide rails 27, so as to determine the position of the slide 26 on the frame 25 and in particular with respect to the guide rails 27. This first position sensor S1 is connected to a control device (not shown in FIGS. 4 and 5). The motor drive (23a or 23b) is also electrically connected to said control device.

Figure 6:
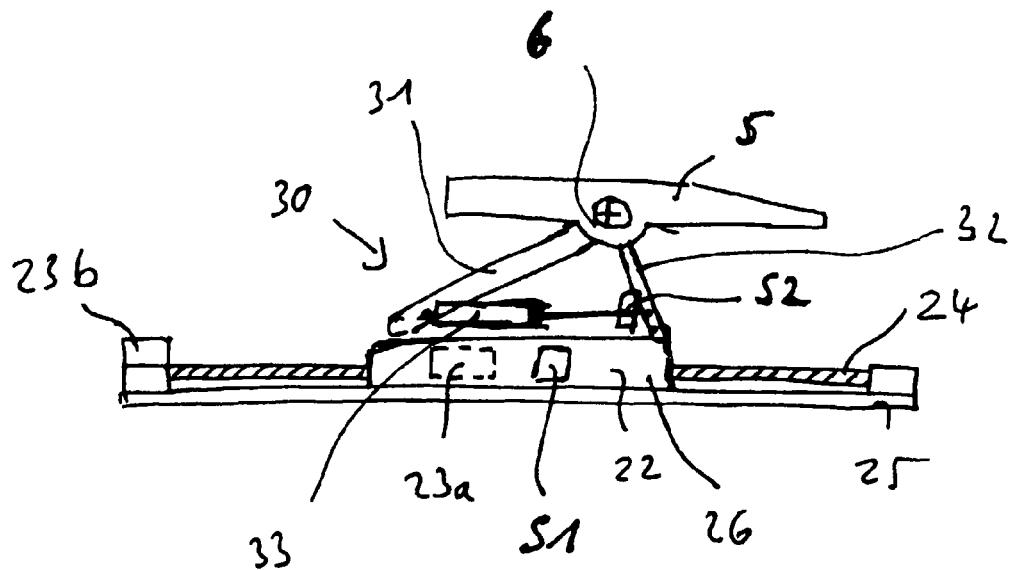
FIG. 6 is a lateral view of an adjusting device, comprised of a displacement device and a lifting device.

FIG. 6 shows another embodiment, wherein a lifting device 30 is disposed on the displacement device 21; device 30 has a plurality of lifting arms 31 and correspondingly a plurality of adjusting arms 32, wherewith the fifth wheel coupling 5 is connected to a corresponding bearing block 6 at the common articulation point of the lifting arms and the displacement arms. For raising and lowering the lifting device 30, a second motor drive 33 is provided, in the form of a pressure cylinder. This pressure cylinder also remains form-interlockingly engaged during the raising and lowering of the fifth wheel coupling.

The lifting device 30 is associated with a second position sensor S2, which determines the lifting altitude, e.g. via the angle of swing of the adjusting arm 32. The motor drive 3 and the position sensor S2 are both connected to the control device (not shown in FIG. 6).

Figure 7:
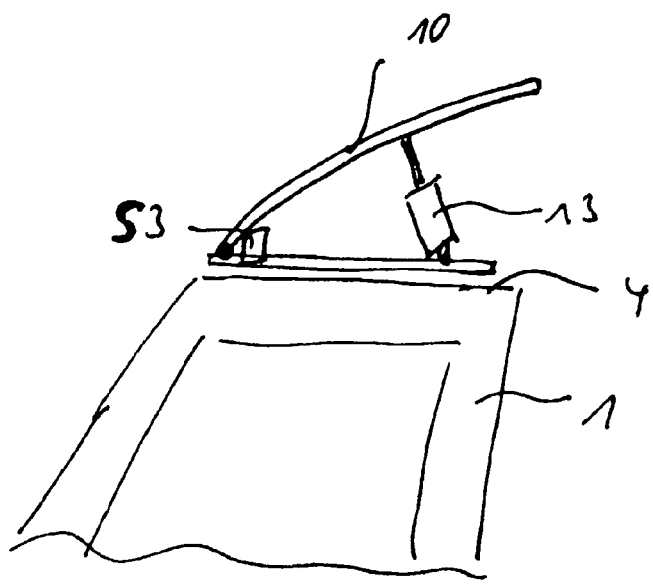
FIG. 7 is a lateral view of a wind deflector.

FIG. 7 shows an adjustable wind deflector 10 disposed on the roof 4 of a tractor vehicle 1. The wind deflector 10 is adjusted by means of a third motor drive, in the form of a pressure cylinder 13. The inclination of the wind deflector 10 is determined by a "third position sensor" S3. The third position sensor S3 and the third motor drive are also electrically connected to the control device.

Figure 8:
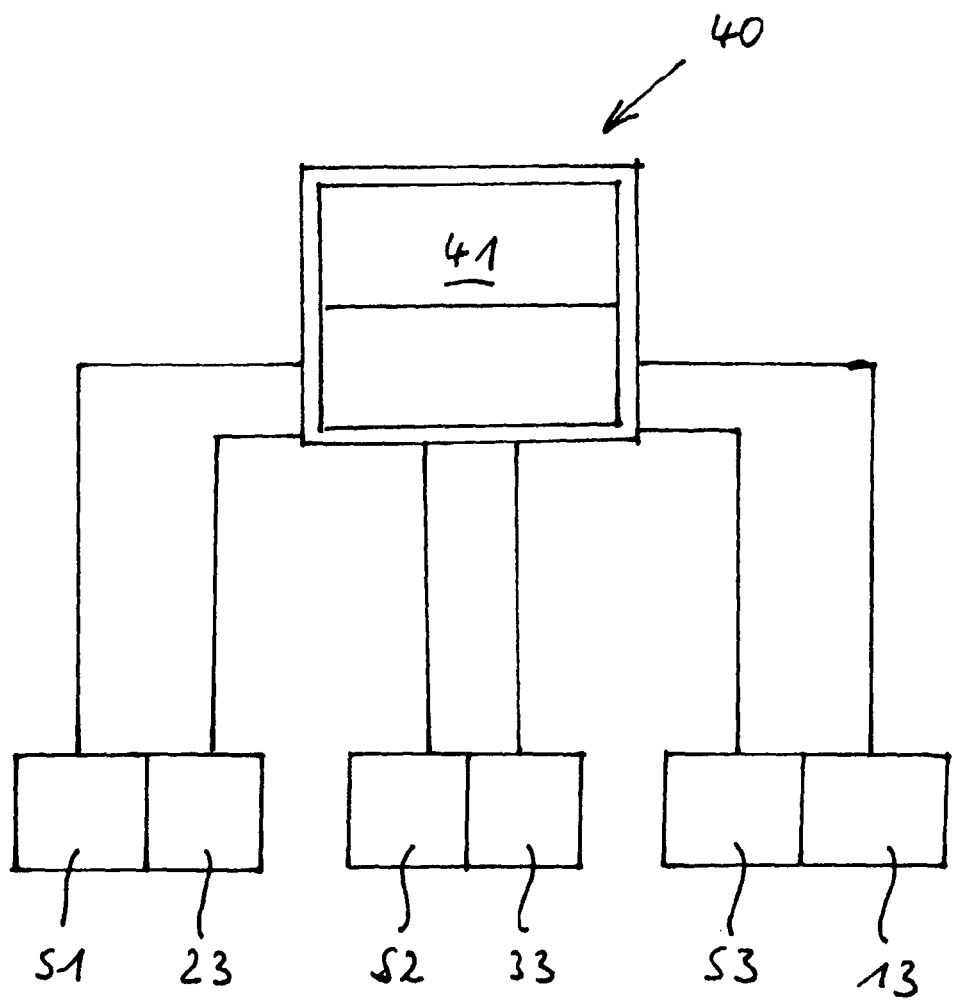
FIG. 8 is a block circuit diagram of a control device.

FIG. 8 shows a block circuit diagram of the control device. The position sensors (S1, S2, S3) and the corresponding drive motors (23, 33, 13) are connected to the control device 40, which device has a display 41. This arrangement can be expanded to encompass the lateral wind deflectors, which have drive devices and position sensors S4, and the shock-absorbing system of the semi-trailer. Preferably the control device is located in the tractor cab, so that the driver can read all of the information on the display 41 while underway, and (possibly) can also adjust the fifth wheel coupling and/or the wind deflector system while underway. Also, the control device may have certain automatic feedback control means which enable automatic adjustment of the drives 13, 23a, 23b, and 33, relating the adjustments to the driving situation.

Figure 9:
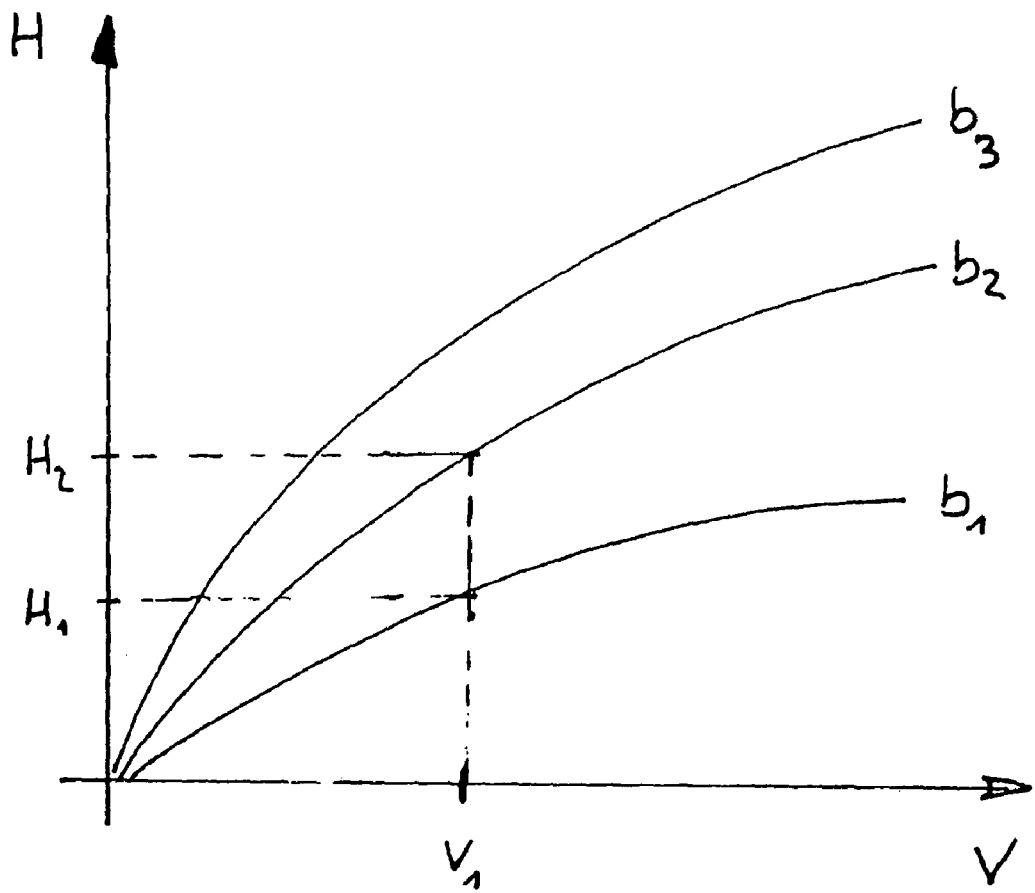
FIG. 9 is an exemplary characteristic diagram.

FIG. 9 shows an exemplary characteristic diagram in which the lifting altitude H is plotted against the speed V for various gap sizes (sizes of the intermediate space 3) (b1, b2, b3). At speed V1 and gap size b1, the control device imposes a lifting altitude H1. If, however, because of road conditions, the gap size b1 and lifting altitude H1 are not practicable for a given speed V1, the driver or the control device may switch to a different characteristic curve, e.g. b2, with the result that the adjusting device is adjusted both in the horizontal and the vertical direction. When the speed V is changed, other adjustments are now made along the characteristic curve.

LIST OF REFERENCE NUMERALS

1 Tractor vehicle
2,2' Semi-trailer
3 Intermediate space
4 Roof
5 Fifth wheel coupling
6 Bearing pedestal
10,10a,10'a,10b Wind deflector
13 Third drive means
20 Adjusting device
21 Displacement device
22 Spindle nut
23a,23b First drive means
24 Drive spindle
25 Frame
26 Slide or carriage
27 Guide rail
28 Traverse
29 Traverse
30 Lifting device
31 Leverarm
32 Adjusting arm
33 Second drive means
40 Control device
41 Display device
S1 First position sensor
S2 Second position sensor
S3 Third position sensor
S4 Fourth position sensor

The invention claimed is:

1. An adjusting device for a fifth wheel coupling, comprising: a displacement device comprised of two guide rails disposed longitudinally on a vehicle, particularly on a tractor of a tractor and semi-trailer combination, and further comprised of a slide which is displaceable on the guide rails, and an actuating device for displacing the slide during travel of the tractor and semi-trailer combination, wherein the actuating device is configured so as to maintain a form-interlocking relationship between a frame and the slide during the course of the displacement; wherein the actuating device for accomplishing the displacement of the slide is comprised of a first motor drive; wherein at least one first position sensor is provided, for determining the position of the slide, where at least the said first position sensor and the first motor drive are connected to a common control device; and wherein the control device is configured so as to evaluate position signals from the first position sensor and to compare said position signals with set-point values dependent on the vehicle speed, and then to send control signals to the motor drive.

2. The device according to claim 1, wherein the first motor drive has at least one drive spindle with one or more spindle nuts.

3. The device according to claim 2, wherein the spindle nut is disposed on the slide.

4. The device according to claim 1, wherein the first motor drive has at least one rack and pinion.

5. The device according to claim 1, wherein the first position sensor is a distance sensor or a rotational angle measurement device.

6. The device according to claim 1, wherein at least two first position sensors are associated with one guide rail.

7. The device according to claim 1, wherein the first position sensors are inductive sensors.

8. The device according to claim 1, wherein a lifting device for the fifth wheel coupling is disposed on the slide, and wherein said lifting device has its own second motor drive which is connected to the control device.

9. The device according to claim 1, wherein the guide rails are attached to a lifting device, and wherein said lifting device has its own second motor drive which is connected to the control device.

10. The device according to claim 8, wherein at least one second position sensor is disposed on the lifting device, and wherein said sensor determines the lifting altitude and is connected to the control device.

11. The device according to claim 1, wherein the control device comprises a device for monitoring and automatic control.

12. The device according to claim 1, having at least one wind deflector for the roof of a tractor cab of the tractor of the tractor and semi-trailer combination; wherein the wind deflector is swingably mounted on the roof and is associated with a third motor drive; wherein at least one third position sensor is provided which determines the adjustment angle of the wind deflector, and wherein the position sensor and the third drive are connected to the control device.

13. The device according to claim 12, wherein at least one wind deflector is provided which is swingably disposed laterally on the cab of the tractor and which is associated with a fourth drive means, wherewith at least one fourth position sensor is provided, and is connected to the control device.

14. The device according to claim 12, wherein the control device comprises a device for monitoring and automatic control.

15. The device according to claim 3, wherein the first position sensor is a distance sensor or a rotational angle measurement device, and wherein at least two first position sensors are associated with one guide rail.

16. The device according to claim 15, wherein the first position sensors are inductive sensors, wherein a lifting device for the fifth wheel coupling is disposed on the slide, and wherein said lifting device has its own second motor drive which is connected to the control device.

17. The device according to claim 16, wherein the guide rails are attached to the lifting device, wherein at least one second position sensor is disposed on the lifting device, and wherein said sensor determines a lifting altitude and is connected to the control device.

18. The device according to claim 17, wherein the control device comprises a device for monitoring and automatic control, having at least one wind deflector for the roof of a tractor cab of the tractor of the tractor and semi-trailer combination; wherein the wind deflector is swingably mounted on the roof and is associated with a third motor drive; wherein at least one third position sensor is provided which determines the adjustment angle of the wind deflector, and wherein the position sensor and the third drive are connected to the control device.

19. The device according to claim 18, wherein at least one wind deflector is provided which is swingably disposed laterally on the cab of the tractor and which is associated with a fourth drive means, wherewith at least one fourth position sensor is provided, and is connected to the control device.

20. The device according to claim 19; wherein the control device comprises a device for monitoring and automatic control.

* * * * *